US012743325B1

(12) United States Patent
Thangavelu et al.

(10) Patent No.: US 12,743,325 B1
(45) Date of Patent: Sep. 22, 2026

(54) CONTINUOUS INTEGRATION AND UPDATING A LIVE EXTRACT, TRANSFORM, AND LOAD (ETL) WORKFLOW BASED ON DETERMINED CODE CHANGE

(71) Applicant: Amazon Technologies, Inc., Seattle, WA (US)

(72) Inventors: Ganesh Vel Thangavelu, Vancouver (CA); Satish Gurav, Bellevue, WA (US); Sandeep Kumar Lakshmichand Jain, Kenmore, WA (US); Shruti Sanjay Shinde, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 951 days.

(21) Appl. No.: 17/456,859

(22) Filed: Nov. 29, 2021

(51) Int. Cl.
*G06F 9/52* (2006.01)
*G06F 8/41* (2018.01)
*G06F 9/50* (2006.01)
*G06F 16/25* (2019.01)

(52) U.S. Cl.
CPC .............. *G06F 9/52* (2013.01); *G06F 16/254* (2019.01); *G06F 8/433* (2013.01); *G06F 9/5038* (2013.01)

(58) Field of Classification Search
None
See application file for complete search history.

(56) References Cited

U.S. PATENT DOCUMENTS

| | | | | |
|---|---|---|---|---|
| 7,665,064 | B2 * | 2/2010 | Able | G06Q 10/10 717/117 |
| 9,705,985 | B1 * | 7/2017 | Chowdhuri | G06F 9/54 |
| 10,846,284 | B1 | 11/2020 | Park et al. | |
| 11,269,610 | B1 * | 3/2022 | Nguyen | G06F 9/44505 |
| 2008/0244565 | A1 * | 10/2008 | Levidow | G06F 9/5038 717/176 |
| 2012/0110564 | A1 * | 5/2012 | Ran | G06F 8/65 717/173 |
| 2013/0227573 | A1 * | 8/2013 | Morsi | G06F 9/5083 718/100 |
| 2015/0058832 | A1 * | 2/2015 | Gonion | G06F 8/433 717/149 |
| 2015/0339207 | A1 * | 11/2015 | Hod | G06F 11/3428 717/124 |
| 2019/0250958 | A1 * | 8/2019 | Kumar | G06F 9/5038 |
| 2020/0034282 | A1 * | 1/2020 | He | G06F 11/3684 |
| 2020/0257611 | A1 | 8/2020 | Hortala et al. | |
| 2021/0019191 | A1 * | 1/2021 | Igubnov | G06F 9/5038 |
| 2021/0073034 | A1 * | 3/2021 | Bliesner | G06F 9/5077 |
| 2022/0091900 | A1 * | 3/2022 | Ito | G06F 9/5077 |
| 2022/0207438 | A1 * | 6/2022 | Johnston | G06F 11/3664 |
| 2022/0318067 | A1 * | 10/2022 | Nayak | G06F 9/542 |

* cited by examiner

*Primary Examiner* — Zujia Xu
(74) *Attorney, Agent, or Firm* — Knobbe, Martens, Olson & Bear, LLP

(57) ABSTRACT

Provided is a system for facilitating continuous integration and continuous deployment of data warehousing workflows in a cloud network environment. A workflow integration and deployment service may communicate with a code repository service to be notified of code changes, obtain code changes, generate updated workflows, test updated workflows, and deploy updated workflows. The workflow integration and deployment service may maintain workflow generation and testing rules to generate, test, and deploy workflows according to user preferences.

20 Claims, 7 Drawing Sheets

TESTING A WORKFLOW PRIOR TO DEPLOYMENT

START

402 DETERMINE EXPECTED OUTPUT

404 DEPLOY WORKFLOW IN A TESTING ENVIRONMENT

406 GENERATE ACTUAL OUTPUT USING DEPLOYED WORKFLOW

408 ACTUAL OUTPUT MATCHES EXPECTED OUTPUT?

NO

YES

410 NOTIFY USER THAT TESTING HAS FAILED

412 DEPLOY WORKFLOW IN THE LIVE ENVIRONMENT

END

CONTINUOUS INTEGRATION AND UPDATING A LIVE EXTRACT, TRANSFORM, AND LOAD (ETL) WORKFLOW BASED ON DETERMINED CODE CHANGE

BACKGROUND

Modern computer systems are frequently implemented as distributed collections of computer systems operating collectively within one or more host computer system environments. Such a host computer environment may deploy computing resources across multiple servers or virtual machines and manage the computing resources on behalf of customers.

DETAILED DESCRIPTION

Introduction

Figure 1:
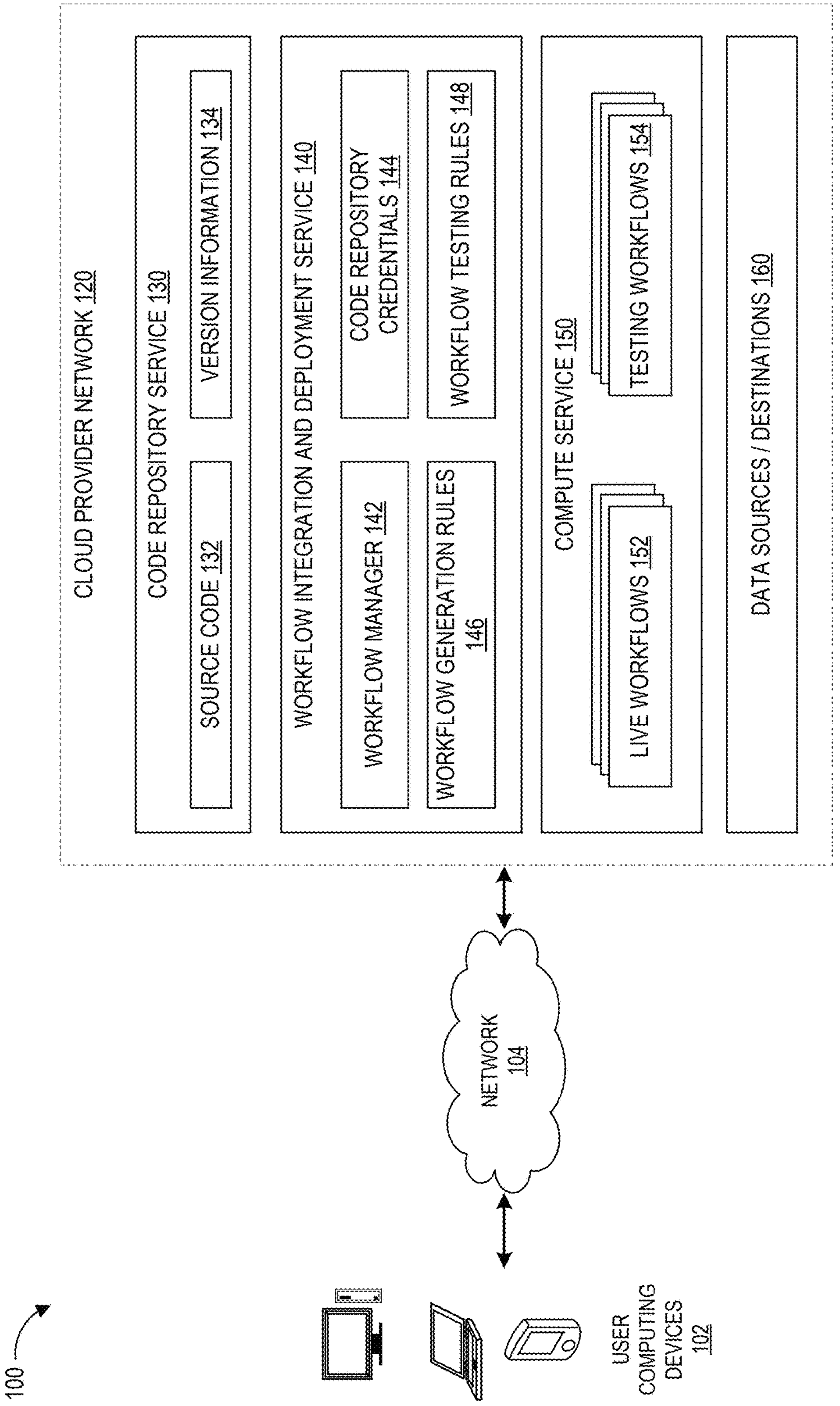
FIG. 1 depicts a schematic diagram of a network environment in which a cloud provider network is used to implement a workflow integration and deployment service in accordance with aspects of the present disclosure.

The present disclosure relates to techniques for facilitating continuous integration and continuous deployment of data warehousing workflows and corresponding datasets in a cloud network environment. A data warehousing workflow can include a large number of tasks that collectively perform the data transformations achieved by the data warehousing workflow, and multiple developers may be involved in maintaining and updating the code used for the tasks. However, when multiple developers are writing and updating the same workflow, their efforts may need to be manually coordinated to avoid accidentally deleting or overwriting parts of the source code, which may be quite difficult or cumbersome.

These aforementioned challenges, among others, are addressed in some embodiments by the disclosed techniques for providing continuous integration and continuous development for data warehousing use cases. These techniques implement a workflow integration and deployment service that can communicate with a code repository service to be notified of code changes, obtain code changes, generate updated workflows, test updated workflows, and deploy updated workflows to operate on corresponding datasets in a seamless manner that does not require manual coordination of code update efforts by code developers. Further, the workflow integration and deployment service may maintain workflow generation and testing rules to generate, test, and deploy workflows and corresponding datasets according to user preferences.

As will be appreciated by one of skill in the art in light of the present disclosure, the embodiments disclosed herein improve the ability of computing systems, such as network systems, code integration systems, code deployment systems, and code execution systems, to provide mechanisms for integrating, testing, deploying, and executing software applications (such as data warehousing jobs that perform data extraction, transformation, and loading) as well as the datasets generated by such software applications, which may result in improved coordination among the individual software applications and updates made thereto, lower error rates due to testing and tracking code changes, and/or efficiency gains due to dependency tracking and data replication.

Prior techniques for managing data warehousing jobs, code changes made thereto, and output datasets resulting from such jobs/code changes relied on manual coordination of develop efforts. However, when multiple datasets are being augmented by transformations written by multiple developers, it may be difficult to manually coordinate the code changes and the corresponding changes in the datasets. Further, each individual code may be associated with its own dependencies (e.g., when and where it can run) and each code change to a piece of code may introduce additional dependencies or modify existing dependencies and/or change how the code fits into the overall topology. Keeping track of all of such changes and updating the overall topology accordingly may be difficult or impossible to be done manually.

In contrast, embodiments of the present disclosure enable seamless integration, testing, deployment, and replication of datasets using data warehousing workflows, without the need of such manual coordination, thereby potentially achieving performance improvements and/or efficiency gains in data warehousing and other jobs that may process data and undergo continuous modifications.

Traditionally data warehousing jobs have involved creating a E—Extract, T—Transform and L—Load (ETL) workflow. ETL workflows take large volumes of raw data from multiple sources, convert the data for analysis, and load the data into the designated repository (sometimes referred to as the data warehouse). In this ETL process there is one or more jobs involved for extracting, transforming, or loading the data and the source control for a job typically lives in the job itself. However, this can create challenges when multiple developers are working in parallel on the ETL workflow. The present disclosure enables the use of CI/CD development practices for ETL jobs. Continuous integration (CI) tools automatically verify that changes to the ETL job code work as expected before such changes are merged into a primary branch, and continuous deployment (CD) tools automatically deploy the latest version of the ETL code to production.

According to the present disclosure, tasks can be organized in a git repo and added to an ETL workflow. A task is a lowest unit of work that needs to be performed for an ETL workflow, and can be used for data processing, data movement, dependency checks, data validation, etc. An ETL workflow according to the present disclosure is a set of related tasks grouped into a single construct. Using this workflow grouping, the disclosed techniques are able to build a dependency graph automatically. The disclosed techniques can, in some embodiments, be performed by a computing system configured with three components: a generator, a control plane, and an executor. The generator can generate a task-based execution plan given a workflow, and supports automated dependency management and automated table management. The control plane, based on real-time conditions, can identify cluster to run and triggers task execution. The control plane can manage cluster scaling and task queuing by optimizing task processing across a group of clusters, and consumes the task-plan generated by the generator. The executor can be a system that does the actual execution of a task.

The presently disclosed embodiments therefore address technical problems inherent within computing systems, data storage systems, and code execution systems, such as updating, testing, and deploying software applications, modifying the topology of software applications in response to code changes, and replicating data across multiple devices/services to increase accessibility by such software applications. These technical problems are addressed by the various technical solutions described herein, including generating updated workflows, testing updated workflows, and replicating data across multiple clusters/services. Thus, the present disclosure represents an improvement on existing data storage systems and code execution systems, and computing systems in general.

These and other aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are illustrate only, and are not intended to be limiting.

Overview of Example Computing Environment for Workflow Integration and Deployment Service FIG. 1 depicts an example computing environment 100 including a cloud provider network 120 in which the disclosed workflow integration and deployment service can be implemented. A cloud provider network (sometimes referred to as a cloud provider system or simply a "cloud") refers to a large pool of network-accessible computing resources (such as compute, storage, and networking resources, applications, and services), which may be virtualized (e.g., virtual machines) or bare-metal (e.g., bare-metal instances or physical machines). The cloud can provide convenient, on-demand network access to a shared pool of configurable computing resources that can be programmatically provisioned and released in response to customer commands. These resources can be dynamically provisioned and reconfigured to adjust to variable load, which provides the "elasticity" of the cloud provider network 120. Cloud computing can thus be considered as both the applications delivered as services over a publicly accessible network (e.g., the Internet, a cellular communication network) and/or the hardware and software in cloud provider data centers that provide those services. It will be appreciated that the disclosed techniques for managing workflow integration and deployment may be implemented in non-elastic computing environments as well.

The cloud provider network 120 can be accessed by user computing devices 102 over a network 104. The cloud provider network 120 may include a code repository service 130 for managing code changes, a workflow integration and deployment service 140 for managing integration, testing, and deployment of code changes to live workflows, a compute service 150 for executing the workflows, and data sources and destinations 160. The components of the cloud provider network 120 are in networked communication with one another and with the network 104 to provide users with on-demand access to the services and resources provided by the cloud provider network 120.

The cloud provider network 120 can provide on-demand, scalable computing platforms to users through the network 104, for example allowing users to have at their disposal scalable "virtual computing devices" via their use of block store, object storage, and compute services. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud provider network 120 can be provided across a number of geographically separate regions, for example to provide users with lower latencies by having their virtual computing devices in or near their geographic location. Each region is physically isolated from and independent of every other region in terms of location and power supply, and may communicate data with the other regions through the network 104. Each region can include two or more availability zones each backed by one or more physical data centers provided with redundant and separate power, networking and connectivity to reduce the likelihood of two zones failing simultaneously. While a single availability zone can span multiple data centers, no two availability zones share a data center. This can protect users from data-center level failures. A data center refers to a physical building or enclosure that houses and provides power and cooling to one or more of the services within the cloud provider network 120. The data centers within an availability zone and the availability zones within a region are connected to one another through private, low-latency links, for example fiber optic network cables. This compartmentalization and geographic distribution of computing hardware enables the cloud provider network 120 to provide fast service to users on a global scale with a high degree of fault tolerance and stability. To distribute resources evenly across the zones in a given region, the provider of the cloud provider network 120 may independently map availability zones to identifiers for each user account.

Turning specifically to the roles of the different servers within the cloud provider network 120, the code repository service 130 includes source code 132 and version information 134. The source code 132 may include a library of tasks that are used to implement one or more workflows, and the version information 134 may indicate the version information associated with such individual tasks. In some embodiments, the source code 132 may be in .sql or .yml file formats. Although the code repository service 130 is illustrated as being part of the cloud provider network 120, in other embodiments, the code repository service 130 described herein may be implemented outside the cloud provider network 120 (e.g., third party code repository service, or a code repository service implemented on a user's on-premises environment).

The workflow integration and deployment service 140 includes a workflow manager 142, code repository credentials 144, workflow generation rules 146, and workflow testing rules 148. The workflow manager 142 may communicate with other components shown in FIG. 1 such as the code repository service 130, the compute service 150, and the user computing devices 102 to facilitate the workflow integration and deployment techniques described herein. For example, the workflow manager 142 may receive and maintain the code repository credentials 144 on behalf of a user, and use the code repository credentials 144 to communicate with the code repository service 130 on behalf of the user to be notified of code changes, and request and obtain code changes. Further, the workflow manager 142 may receive and maintain the workflow generation rules 146 to generate workflows according to user preferences and/or default rules. The workflow generation rules 146 may specify how the code of the individual tasks of a workflow is to be parsed to identify dependencies and how the individual tasks of the workflow should be arranged in a topology. In some cases, the workflow generation rules 146 may include any pre-approvals or conditions specified by the user (e.g., for propagating detected code changes to the live workflow). Further, the workflow manager 142 may receive and maintain the workflow testing rules 148 to test generated workflows generate workflows according to user preferences and/or default rules, before they are deployed in the live environment. In some cases, the work workflow testing rules 148 may include any pre-approvals or conditions specified by the user (e.g., for deploying updated workflows in the live environment). The techniques for managing workflow integration and deployment are described in greater detail below with reference to FIGS. 2-4.

The compute service 150 include one or more servers on which provide resizable computing capacity to users for building and hosting their software systems. Users can use the compute service 150 to launch as many virtual computing environments, referred to as "instances," as they need. Instances can have various configurations of processing power, memory, storage, and networking capacity depending upon user needs. The compute service 150 can also include computer storage for temporary data used while an instance is running, however as soon as the instance is shut down this data is lost. As shown in FIG. 1, these instances can be used to execute live workflows 152 and/or testing workflows 154. One or more of these instances may be assigned (e.g., for a fixed duration, indefinitely, or on a per-request basis) to a user and used to execute workflows of that user. Although instances are used as an example, the workflows described herein or any component(s) thereof can be executed in a container, a microVM, a node, or any other forms of compute capacity described herein. In some embodiments, such units of compute capacity may be arranged in the form of a computing "cluster," which can include at least one cluster master (which runs control processes including scheduling, resource control, handling API requests, and deciding what runs on the cluster's nodes) and multiple units of compute capacity such as nodes (which are the worker machines that run tasks and/or containerized applications and other workloads). These clusters can run across a number of physical machines in a distributed computing environment such as a cloud provider network. In some embodiments, one or more tasks that are part of a workflow can be designated to run on one or more specific clusters, thereby creating cluster dependencies for such tasks. Such cluster dependencies (e.g., which task is allowed to run on which cluster) are considered by the workflow manager 142, along with code dependencies (e.g., sequencing of tasks) and resource dependencies (e.g., resource available to execute tasks), when scheduling the workflows according to the techniques described herein.

The data sources and destinations 160 may include any source and/or destination specified in connection with one or more workflows executed on the compute service 150. For example, a data source of a workflow associated with a user may include an instance provisioning service, the input data may be a transaction log generated by the instance provisioning service, and the output data generated by the workflow may be stored at a destination location, which may be a database accessible by the user. As another example, a data source of a workflow associated with a user may include an object storage service, the input data may be data added to a particular storage bucket within the object storage service, and the output data generated by the workflow may be stored at a destination location, which may be an analytics service that can further process the output data to generate additional reports and insights.

Although not shown in FIG. 1, some implementations of cloud provider network 120 can additionally include block store servers, object storage servers, domain name services ("DNS") servers, relational database servers, and other server configurations (not illustrated) for supporting on-demand cloud computing platforms. Each server includes hardware computer memory and/or processors, an operating system that provides executable program instructions for the general administration and operation of that server, and a computer-readable medium storing instructions that, when executed by a processor of the server, allow the server to perform its intended functions.

The components of the cloud provider network 120 (e.g., the code repository service 130 and the workflow integration and deployment service 140) may provide a set of application programming interfaces ("APIs") that can be used by the users of the user computing devices 102 or by each other to commit code changes, send notifications, generate and test workflows, deploy workflows, and the like. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

A container, as referred to herein, packages up code and all its dependencies so an application (also referred to as a task, pod, or cluster in various container platforms) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example, by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

In the context of some software container services, a task refers to a container, or multiple containers working together, running to execute the functionality of a software application or a particular component of that application. In some implementations, tasks can also include virtual machines, for example, virtual machines running within instance(s) hosting the container(s). A task definition can enable container images to be run in a cloud provider network to execute a task. A task definition can specify parameters including which container image to use with each container in the task, interactions between containers, constraints on container placement within a cloud provider network, what quantities of different hardware resources should be allocated to the task or to specific containers, networking modes, logging configurations, persistent storage that should be used with the containers in the task, and whether the task continues to run if a container finishes or fails. Multiple containers can be grouped into the same task definition, for example, linked containers that must be run together to execute related processes of an application, containers that share resources, or containers that are required to be run on the same underlying host. An entire application stack can span multiple task definitions by separating different components of the application into their own task definitions. An application can be defined using a service definition, which can specify configuration parameters that define the service including which task definition(s) to use, how many instantiations of each task to run, and how the tasks should be load balanced.

In some implementations, customers of a cloud provider network 120 can deploy containers by managing clusters of compute instances that run container agents. In such implementations, customers manage scaling, monitoring, patching, and security of the compute instances, in addition to managing their containerized workload. In some implementations, customers of a cloud provider may deploy and scale containerized workloads automatically without having to manage the underlying computing resources, for example, via a container management service that receives information from a customer about their workload and then automatically selects the appropriate compute resources to run the workload. Beneficially, such a "serverless container" approach abstracts away the underlying infrastructure, enabling the customer to simply focus on their containerized application, by managing clusters of compute instances on behalf of the customer.

The traffic and operations of the cloud provider network 120 may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information, etc.). The data plane includes customer resources that are implemented on the cloud provider network (e.g., computing instances, containers, block storage volumes, databases, file storage, etc.). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

The cloud provider network 120 can be formed as a number of regions, where a region is a separate geographical area in which the cloud provider clusters data centers. Each region can include two or more availability zones connected to one another via a private high speed network, for example, a fiber communication connection. An availability zone (also known as an availability domain, or simply a "zone" or an "AZ") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the cloud provider network to provide low latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network 120 can provide on-demand, scalable computing platforms to users through the network 104, for example, allowing users to have at their disposal scalable physical and/or virtual computing devices via their use of the instances illustrated in FIG. 1. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

As illustrated in FIG. 1, the cloud provider network 120 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. The user computing devices 102 can include any network-equipped computing device, for example, desktop computers, laptops, smartphones, tablets, e-readers, gaming consoles, and the like. Users can access the cloud provider network 120 via the network 104 to view or manage their data and computing resources, as well as to use websites and/or applications hosted by the cloud provider network 120.

The cloud provider network 120 may implement various computing resources or services (some of which may not be illustrated in FIG. 1), which may include a compute service (referred to in various implementations as an elastic compute service, a virtual machines service, a computing cloud service, a compute engine, or a cloud compute service), a container orchestration and management service (referred to in various implementations as a container service, cloud container service, container engine, or container cloud service), a Kubernetes-based container orchestration and management service (referred to in various implementations as a container service for Kubernetes, Azure Kubernetes service, IBM cloud Kubernetes service, Kubernetes engine, or container engine for Kubernetes), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider network 120, in contrast to resources requested by users of the cloud provider network 120, which may be provisioned in user accounts. The disclosed techniques for managing workflow integration and deployment can be implemented as part of a virtual compute service, container service, or Kubernetes-based container service in some embodiments.

In some embodiments, the execution of compute instances is supported by a lightweight virtual machine manager (VMM). These VMMs enable the launch of lightweight micro-virtual machines (microVMs) in non-virtualized environments in fractions of a second. These VMMs can also enable container runtimes and container orchestrators to manage containers as microVMs. These micro VMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

Although some embodiments of the present disclosure describe an instance as being a virtual machine, an instance, as used herein, may refer to any one of a virtual machine instance, a bare-metal instance, a microVM, a physical machine, a container, a node, an offload card, or another unit of compute capacity configurable to execute user code. Such an instance may reside within the cloud provider network 120 or within an on-premises environment outside the cloud provider network 120.

Example Workflow for Updating a Workflow in Response to a Code Change

Figure 2:
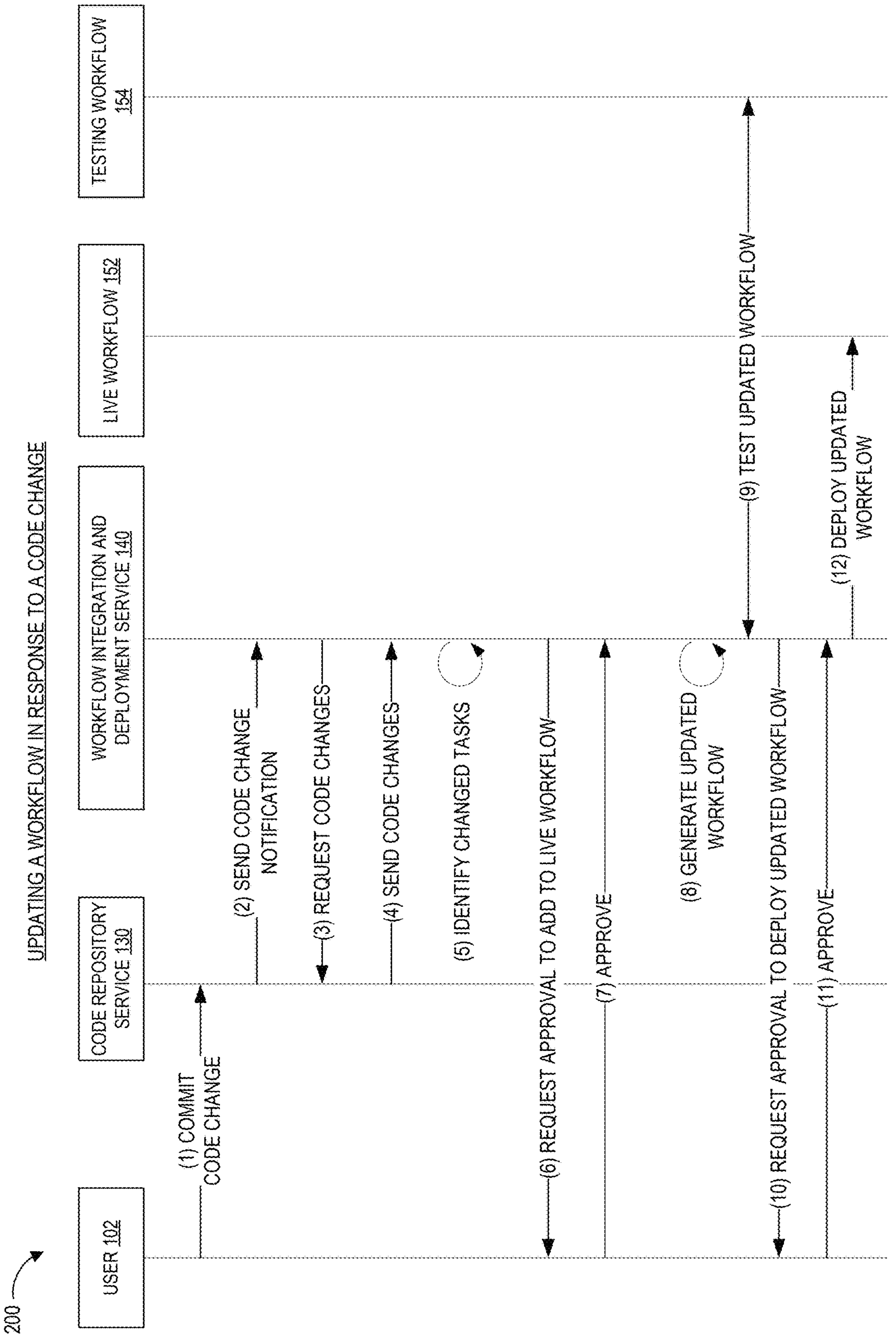
FIG. 2 depicts a workflow diagram of an example process for updating a workflow in response to a code change in accordance with aspects of the present disclosure.

FIG. 2 depicts a workflow diagram of an example process for updating a workflow in response to a code change in accordance with aspects of the present disclosure. As shown in FIG. 2, at (1), a user 102 commits a code change to the code repository service 130. For example, the user may be a developer updating the code for a task that is part of a larger workflow for performing data transformations. At (2), in response to the committed code change, the code repository service 130 sends a code change notification to the workflow integration and deployment service 140. At (3), in response, the workflow integration and deployment service 140 requests the code changes (e.g., using an API made available by the code repository service 130), and at (4), in response, the code repository service 130 sends the code changes to the workflow integration and deployment service 140. At (5), based on the received code changes, the workflow integration and deployment service 140 identifies the changed tasks that are associated with the live workflow 152. At (6), the workflow integration and deployment service 140 requests user approval to propagate the code changes to the live workflow 152. At (7), in response, the user 102 provides the requested approval to the workflow integration and deployment service 140. At (8), the workflow integration and deployment service 140 generates an updated workflow reflecting the code changes made to the tasks identified at (5), according to one or more workflow generation rules. At (9), the workflow integration and deployment service 140 tests the updated workflow, according to one or more workflow testing rules. At (10), if the testing at (9) is successful, the workflow integration and deployment service 140 requests user approval to deploy the updated workflow to the live environment. At (11), in response, the user 102 provides the requested approval to the workflow integration and deployment service 140. In response, at (12), the workflow integration and deployment service 140 deploys the updated workflow (e.g., by making changes to the live workflow or by replacing the live workflow with the updated workflow) such that the live workflow 152 reflects the code changes committed at (1). Although (6), (7), (10), and (11) are illustrated in FIG. 2, in some embodiments, one or both of the approval steps may be omitted based on a previously provided user approval or based on a default or user preference not to seek user approval. Additional details regarding the workflow generation and testing process are provided in greater detail below with reference to FIGS. 3 and 4.

Example Routine for Updating a Workflow in Response to a Code Change

Figure 3:
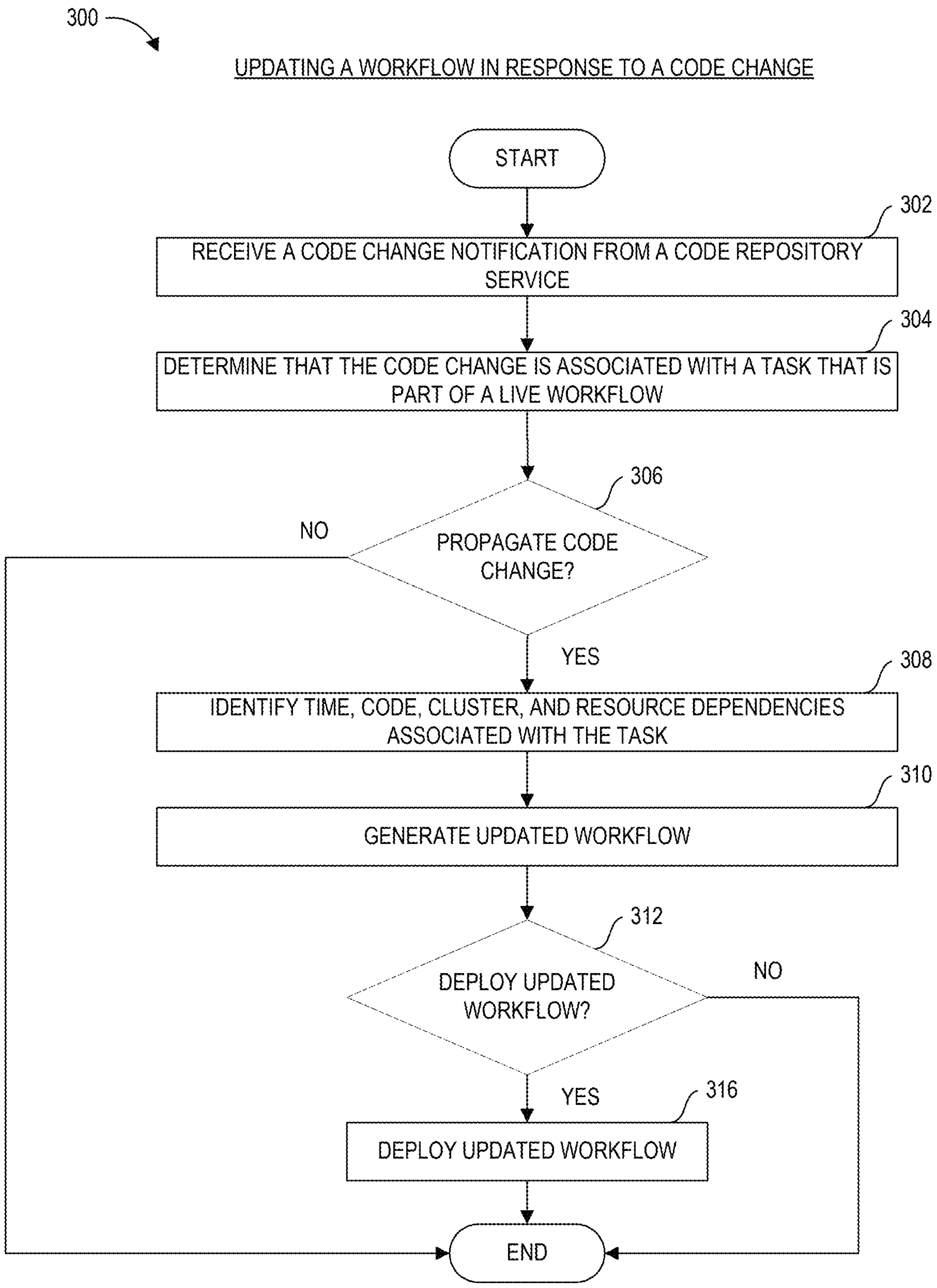
FIG. 3 is a flowchart of an example process for updating a workflow in response to a code change in accordance with aspects of the present disclosure.

FIG. 3 depicts an illustrative routine 300 for updating a workflow in response to a code change in accordance with aspects of the present disclosure. The routine 300 may be carried out, for example, by the workflow integration and deployment service 140 or one or more other components of the cloud provider network 120 described herein. For convenience, some or all of the steps of the routine 300 are described as being performed by the workflow integration and deployment service 140. For example, the workflow integration and deployment service 140 may include one or more hardware computing devices and non-transitory physical computer storage storing instructions that, when executed by the one or more hardware computing devices, cause the one or more hardware computing devices to perform the steps of the routine 300.

The routine 300 begins at block 302, at which the workflow integration and deployment service 140 receives a code change notification from a code repository service. For example, the workflow integration and deployment service 140 may periodically poll the code repository service 130 for any changes to one or more particular tasks or workflows. As another example, the workflow integration and deployment service 140 may set up a trigger for one or more particular tasks or workflows such that the code repository service 130 automatically sends a code change notification to the workflow integration and deployment service 140 in response to a change made to such tasks or workflows.

At block 304, the workflow integration and deployment service 140 determines that the code change is associated with a task that is part of a live workflow. In some embodiments, the code change may include changes to multiple tasks within the same live workflow.

At block 306, the workflow integration and deployment service 140 determines whether the code change is to be propagated to the live workflow. If the workflow integration and deployment service 140 determines that the code change is not to be propagated to the live workflow, the routine 300 may end. Otherwise, the workflow integration and deployment service 140 proceeds to block 308.

At block 308, the workflow integration and deployment service 140 identifies the dependencies associated with the task. In some cases, the dependencies are identified by parsing the underlying code associated with the task. In other cases, the dependencies are identified by processing certain metadata associated with the task (e.g., a list of tasks on which the task depends, a list of other tasks that depend on the task, a list of cluster requirements, a list of resource requirements, etc.). Such metadata may be provided by the user. For example, a time dependency of a task may indicate the time or time range at which the task is to be executed, a code dependency of a task may indicate other task(s) on which the task depends or other task(s) that depend on the task, a cluster dependency may indicate the cluster on which the task is to be executed, and a resource dependency may indicate the amount and/or type of computing resources to be used by or allocated to the task. Additional details relating to dependencies are provided in U.S. Pat. No. 10,846,284, titled "VIEW-BASED DATA MART MANAGEMENT SYSTEM," which is incorporated herein by reference in its entirety.

At block 310, the workflow integration and deployment service 140 generates an updated workflow that includes the code change, in accordance with the dependencies identified at block 308.

At block 312, the workflow integration and deployment service 140 determines whether the updated workflow is to be deployed to the live environment. If the workflow integration and deployment service 140 determines that the updated workflow is to be deployed to the live environment, the routine 300 proceeds to block 316, where the workflow integration and deployment service 140 deploys the updated workflow. Otherwise, the routine 300 proceeds to block 314, where the workflow integration and deployment service 140 outputs an error message indicating that the code change was not propagated to the live workflow. The routine 300 may then end.

The routine 300 can include fewer, more, or different blocks than those illustrated in FIG. 3 and/or one or more blocks illustrated in FIG. 3 may be modified, omitted, or switched without departing from the scope of the description. For example, the outcome of one or more blocks above (e.g., decision blocks 306 and 312) may be stored in the form of a log message in a log file. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Testing a Workflow Prior to Deployment

Figure 4:
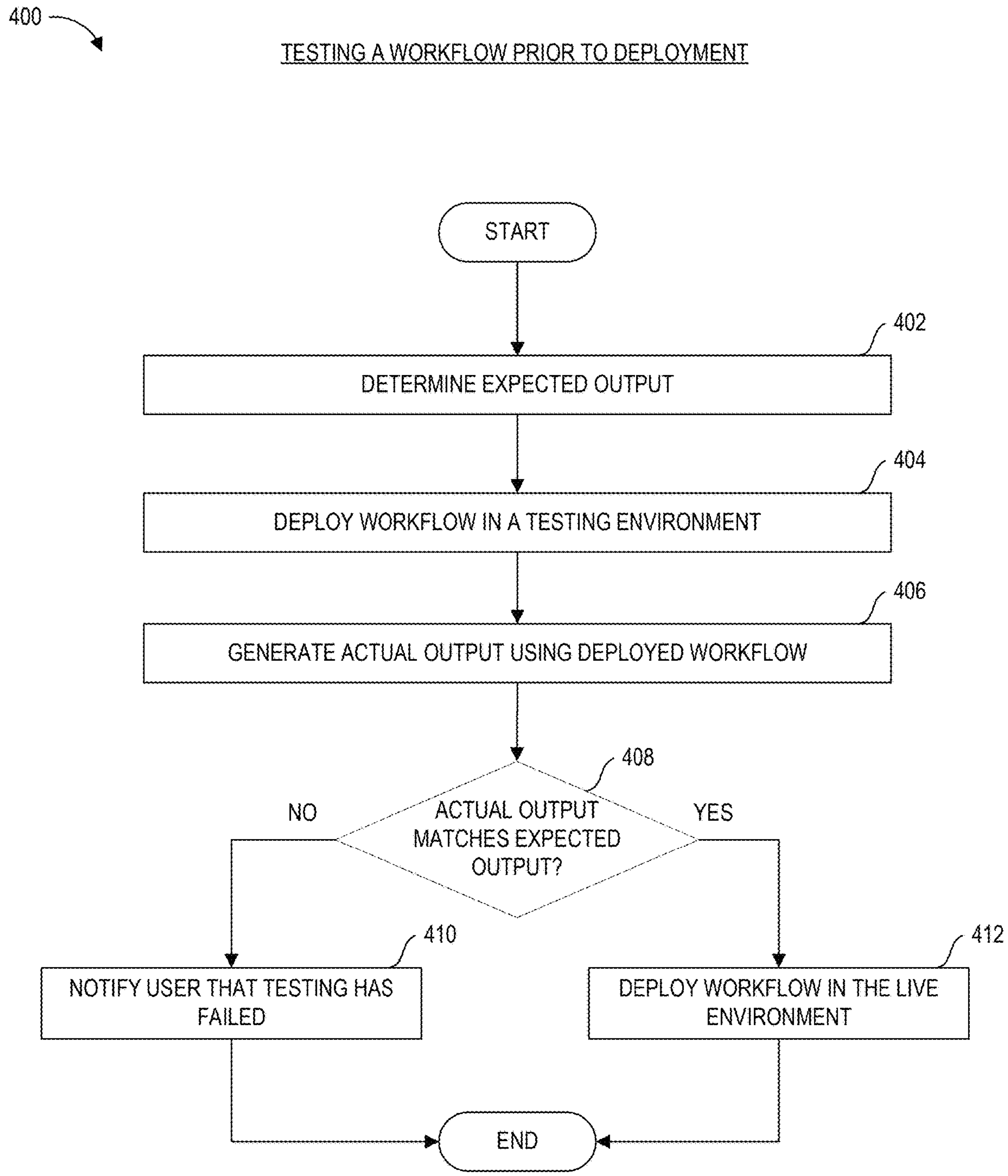
FIG. 4 is a flowchart of an example process for testing a workflow prior to deployment in accordance with aspects of the present disclosure.

FIG. 4 depicts an illustrative routine 400 for testing a workflow prior to deployment in accordance with aspects of the present disclosure. The routine 400 may be carried out, for example, by the workflow integration and deployment service 140 or one or more other components of the cloud provider network 120 described herein. For convenience, some or all of the steps of the routine 400 are described as being performed by the workflow integration and deployment service 140. For example, the workflow integration and deployment service 140 may include one or more hardware computing devices and non-transitory physical computer storage storing instructions that, when executed by the one or more hardware computing devices, cause the one or more hardware computing devices to perform the steps of the routine 400.

The routine 400 begins at block 402, at which the workflow integration and deployment service 140 determines an expected output for a workflow to be tested (e.g., a workflow that has been generated in response to a code change and is different from the live workflow). The expected output may be provided by a user or developer associated with the workflow. In other cases, the expected output may be an actual output previously generated by the live workflow.

At block 404, the workflow integration and deployment service 140 deploys the workflow in a testing environment. The testing environment may include compute capacity assigned to the user and specified by the user, which may be different from the compute capacity on which the live workflow is deployed.

At block 406, the workflow integration and deployment service 140 generates an actual output using the workflow deployed at block 404. For example, the workflow integration and deployment service 140 may generate the actual output by feeding a set of input data provided by the user into the deployed workflow. As another example, the workflow integration and deployment service 140 may generate the actual output by feeding a set of input data that was previously fed into the live workflow to generate the expected output.

At block 408, the workflow integration and deployment service 140 determines whether the actual output matches the expected output. For example, the workflow integration and deployment service 140 may determine that the actual output matches the expected output based on the actual output being identical to the expected output. As another example, the workflow integration and deployment service 140 may determine that the actual output matches the expected output based on a difference between the actual output and the expected output being within a threshold level or percentage. Additional details relating to testing or verifying code changes are provided in U.S. Pat. App. Pub. No. 2020/0257611A1, titled "AUTOMATED SOFTWARE VERIFICATION SERVICE," which is incorporated herein by reference in its entirety.

If the workflow integration and deployment service 140 determines that the actual output matches the expected output, the routine 400 proceeds to block 412, where the workflow integration and deployment service 140 deploys the workflow in the live environment (e.g., effectively replacing the currently deployed live workflow). Otherwise, the routine 400 proceeds to block 410, where the workflow integration and deployment service 140 outputs a notification to the user indicating that the testing has failed and that the code change has not been propagated to the live workflow. The routine 400 may then end.

The routine 400 can include fewer, more, or different blocks than those illustrated in FIG. 4 and/or one or more blocks illustrated in FIG. 4 may be modified, omitted, or switched without departing from the scope of the description. For example, the outcome of one or more blocks above (e.g., decision block 408) may be stored in the form of a log message in a log file. Moreover, it will be appreciated by those skilled in the art and others that some or all of the functions described in this disclosure may be embodied in software executed by one or more processors of the cloud provider network 120 and/or the user computing device 102 disclosed herein.

Example Operations Performed by Workflow Integration and Deployment Service

Figure 5:
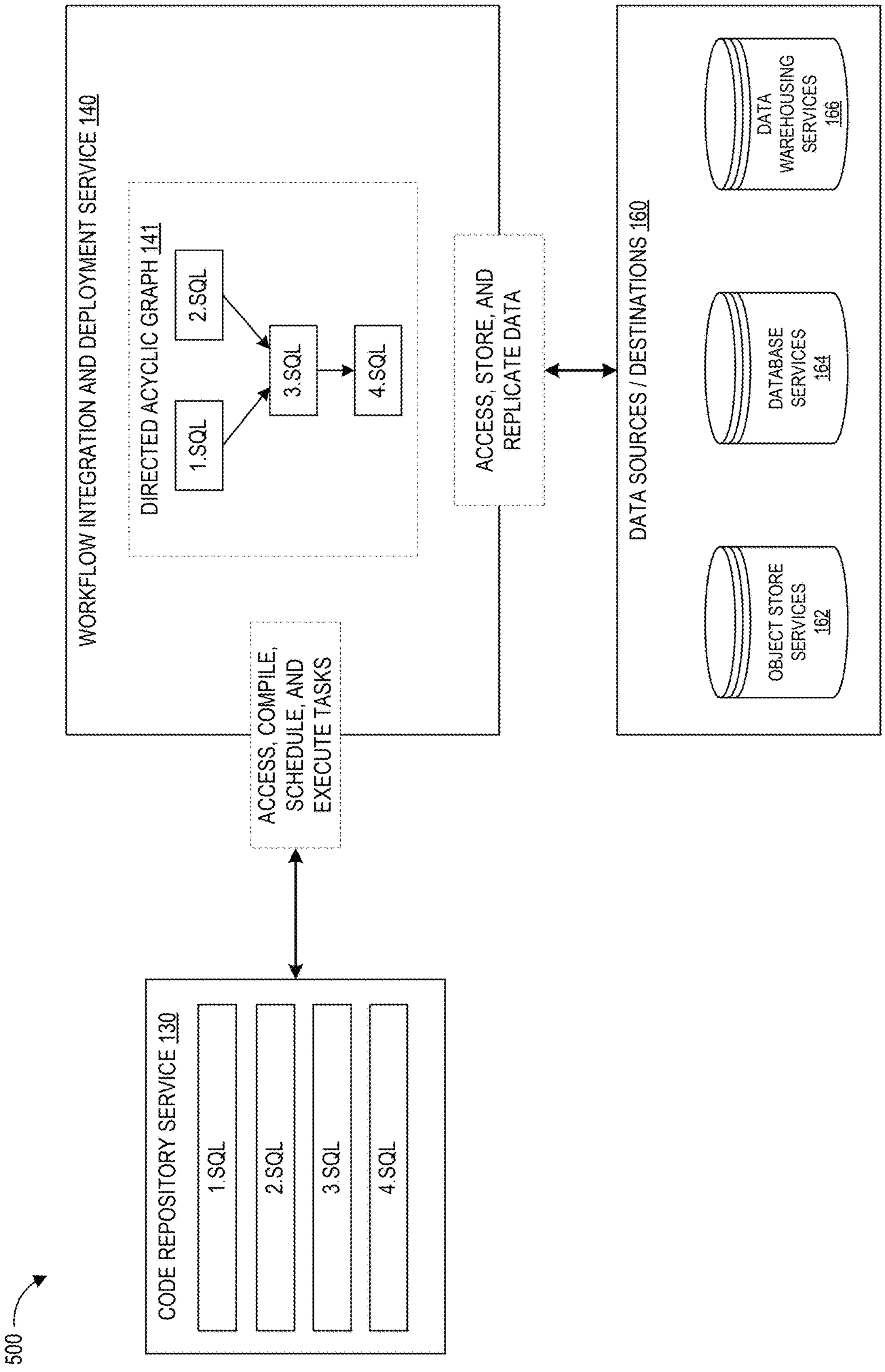
FIG. 5 is a block diagram illustrating example operations performed by a workflow integration and deployment service in accordance with aspects of the present disclosure.

FIG. 5 depicts a block diagram 500 illustrating example operations performed by the workflow integration and deployment service 140 in accordance with aspects of the present disclosure. FIG. 5 illustrates the code repository service 130 storing SQL code for an example code package (e.g., 1.sql, 2.sql, 3.sql, and 4.sql) and in communication with the workflow integration and deployment service 140, which accesses the SQL code, compiles the code, schedules the code for execution, and executes the code according to the schedule. As described above, the code to be executed as part of a data warehousing workflow may also be referred to herein as tasks. Additionally, as shown in FIG. 5, the workflow integration and deployment service 140 may generate a directed acyclic graph (DAG) 141 based on the dependencies (e.g., time dependencies, code dependencies, cluster dependencies, resource dependencies, etc.) of the underlying tasks (e.g., 1.sql, 2.sql, 3.sql, and 4.sql), and the workflow integration and deployment service 140 may use the DAG 141 to schedule and execute the individual tasks in the DAG 141.

Additionally, as shown in FIG. 5, the workflow integration and deployment service 140 may be in communication with the data sources/destinations 160 and access, store, and replicate data across one or more of the data sources/destinations 160. Some examples of the data sources/destinations 160 may include object store services 162, database services 164, and data warehousing services 166. However, data can be accessed from and/or stored to other forms of data storage services.

In some embodiments, the cluster of compute capacity in which one of the tasks of the DAG 141 is to be executed may reside on a service that is separate or remote from another service on which another one of the tasks of the DAG 141 is to be executed. In some of such embodiments, despite the two services being separate or remote from each other, data may be shared between the two services and one of the tasks may access the data generated by the other task (e.g., either directly or via a centralized data storage service in communication with both of those services). In other embodiments, data may not be shared between the two services, and the tasks executing on the two separate/remote services, respectively, may not be able or allowed to access the data generated by each other. In such embodiments, the workflow integration and deployment service 140 may replicate data across such services to facilitate access to the data by downstream tasks. The replication process is described in greater detail below with reference to FIG. 6.

Example Routine for Performing Task Execution and Automated Replication

Figure 6:
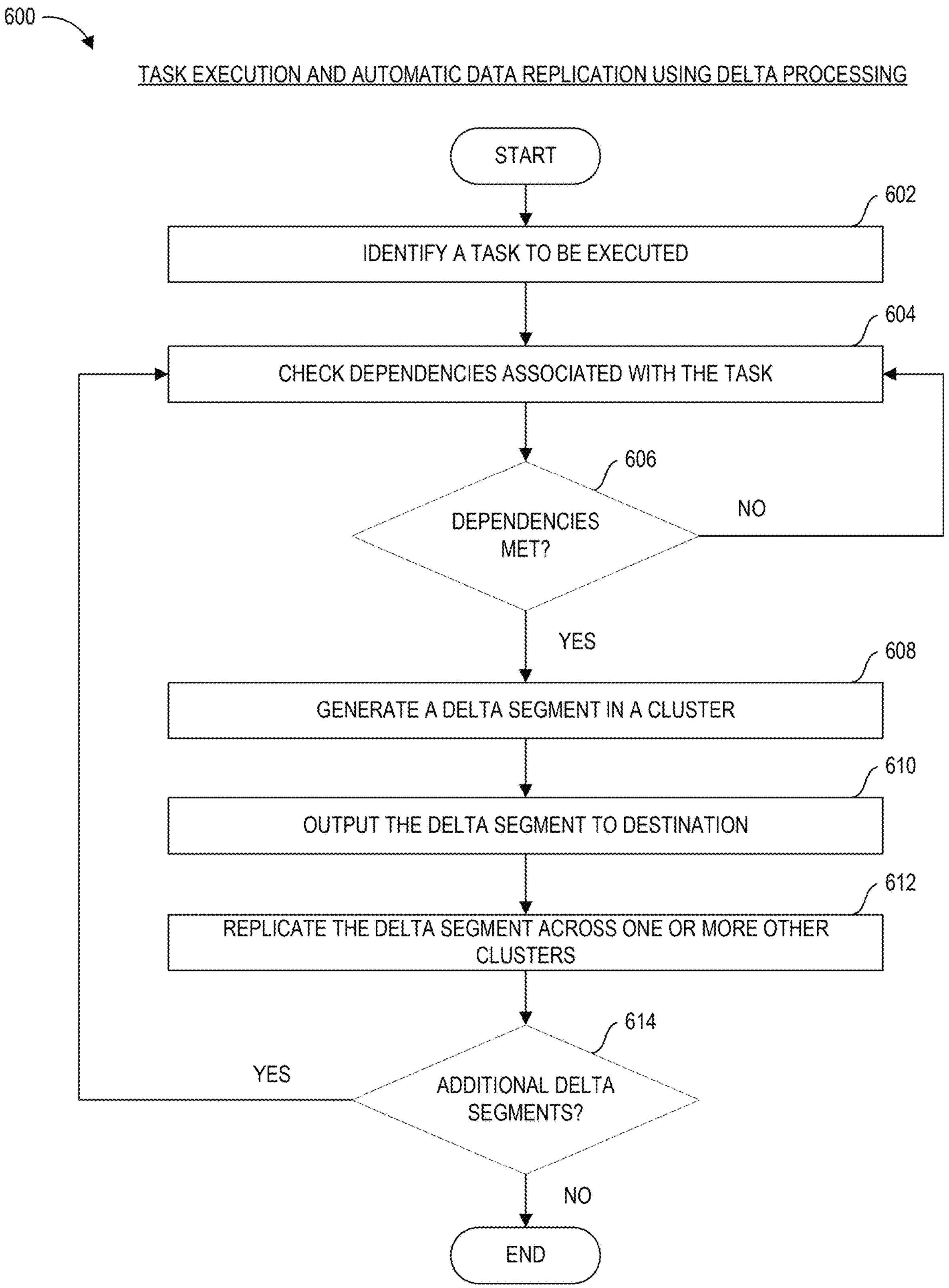
FIG. 6 is a flow chart of an example process for performing task execution and automatic data replication using delta processing in accordance with aspects of the present disclosure.

FIG. 6 depicts an illustrative routine 600 for testing a workflow prior to deployment in accordance with aspects of the present disclosure. The routine 600 may be carried out, for example, by the workflow integration and deployment service 140 or one or more other components of the cloud provider network 120 described herein. For convenience, some or all of the steps of the routine 600 are described as being performed by the workflow integration and deployment service 140. For example, the workflow integration and deployment service 140 may include one or more hardware computing devices and non-transitory physical computer storage storing instructions that, when executed by the one or more hardware computing devices, cause the one or more hardware computing devices to perform the steps of the routine 600.

The routine 600 begins at block 602, at which the workflow integration and deployment service 140 identifies a task to be executed ("current task"). For example, the identified task may be one of the tasks included in the DAG 141 shown in FIG. 5.

At block 604, the workflow integration and deployment service 140 checks the dependencies associated with the task. For example, as described herein, such dependencies may include time dependencies, code dependencies, cluster dependencies, resource dependencies, and the like. In some embodiments, the dependencies include those associated with a specific delta or partition window (e.g., has the input data to be processed by the current task corresponding to a specific date range been outputted by a previous task on which the current task depends and stored in a cluster accessible by the current task?). Additionally, or alternatively, the dependencies include those associated with the task itself (e.g., is there a cluster that is allowed to execute the current task and has sufficient compute capacity to execute the current task available?). Checking the dependencies may include determining, for each dependency associated with the task, whether the dependency has been met such that the task is ready to be executed.

In some embodiments, the task itself or metadata associated with the execution of the task indicates the details relating to a delta or partition window (e.g., partition type/column, partition start, partition end, partition size, and the like). In other embodiments, the task itself or metadata associated with the execution of the task does not indicate that the input data to be processed by the current task is to be processed using delta processing, but the workflow integration and deployment service 140 automatically generates the parameters for delta processing (e.g., the size of the delta/partition for which blocks 604-612 are to be repeated) for faster and more efficient processing/generation/replication. For example, the workflow integration and deployment service 140 may do so by dividing the total range of the input data by a specific number (e.g., dividing a year's worth of input data into 12 partitions, dividing 10 years' worth of data into 10 partitions, etc.) and repeat the execution of the current task (e.g., blocks 604-612) for each such partition.

At block 606, the workflow integration and deployment service 140 determines whether all of the dependencies associated with the task are met. If the workflow integration and deployment service 140 determines that all of the dependencies are met, the routine 600 proceeds to block 608. Otherwise, the routine 600 returns to block 604 to continue to check on the dependencies.

At block 608, the workflow integration and deployment service 140 generates a delta segment in a cluster. For example, the workflow integration and deployment service 140 may cause the current task to be executed in a cluster that is allowed to execute the current task and has sufficient available compute capacity to execute the current task and cause the current task to process the input data (e.g., all of the input data or input data corresponding to a specific portion/partition thereof).

At block 610, the workflow integration and deployment service 140 outputs the delta segment to a destination location. For example, the generated delta segment may be outputted to one or more of the object store services 162, database services 164, and/or data warehousing services 166 shown in FIG. 5.

At block 612, the workflow integration and deployment service 140 replicates the delta segment across one or more other clusters. For example, the workflow integration and deployment service 140 may replicate the delta segment to a cluster that is part of another service that cannot or is not configured to access the cluster in which the delta segment was initially generated, such that the delta segment is available to one or more other clusters (e.g., where other downstream tasks that require or are configured to access the delta segment might be executed) that are part of that service. In some embodiments, the workflow integration and deployment service 140 identifies the clusters and/or services to which the delta segment is to be replicated based on its knowledge about which downstream tasks might access the delta segment from which cluster and/or services. For example, after generating the delta segment using 3.sql of FIG. 5 in cluster A in data warehousing service X, if the workflow integration and deployment service 140 determines that the delta segment is to be accessed by 4.sql of FIG. 5 from cluster B in data warehousing service Y that is not allowed or configured to access cluster A, the workflow integration and deployment service 140 may replicate the delta segment to cluster B (or another cluster accessible by a task executing in cluster B). In other embodiments, the workflow integration and deployment service 140 replicates the delta segment to one or more designated clusters and/or services specified by the user or default settings. For example, any data generated in clusters in data warehousing service X may be replicated to a cluster in data warehousing service Y. Before replicating a delta segment to a replication destination, the workflow integration and deployment service 140 may check whether the delta segment is stored in or accessible by a cluster in the replication destination. In yet another embodiment, the workflow integration and deployment service 140 replicates delta segments to a centralized data store accessible by multiple clusters and/or services.

At block 614, the workflow integration and deployment service 140 determines whether there exist any additional delta segments to be generated using the task. If the workflow integration and deployment service 140 determines that there exist additional delta segments, the routine 600 returns to block 604 to continue to process additional delta segments (e.g., by identifying another delta window, checking on its dependencies, generating a delta segment corresponding to the delta window, and outputting and replicating the delta segment). Otherwise, the routine 600 may then end.

The routine 600 can include fewer, more, or different blocks than those illustrated in FIG. 6 and/or one or more blocks illustrated in FIG. 6 may be modified, omitted, or switched without departing from the scope of the description. For example, the outcome of one or more blocks above may be stored in the form of a log message in a log file. Moreover, it will be appreciated by those skilled in the art and others that some or all of the functions described in this disclosure may be embodied in software executed by one or more processors of the cloud provider network 120 and/or the user computing device 102 disclosed herein.

Example Architecture of Computing System

Figure 7:
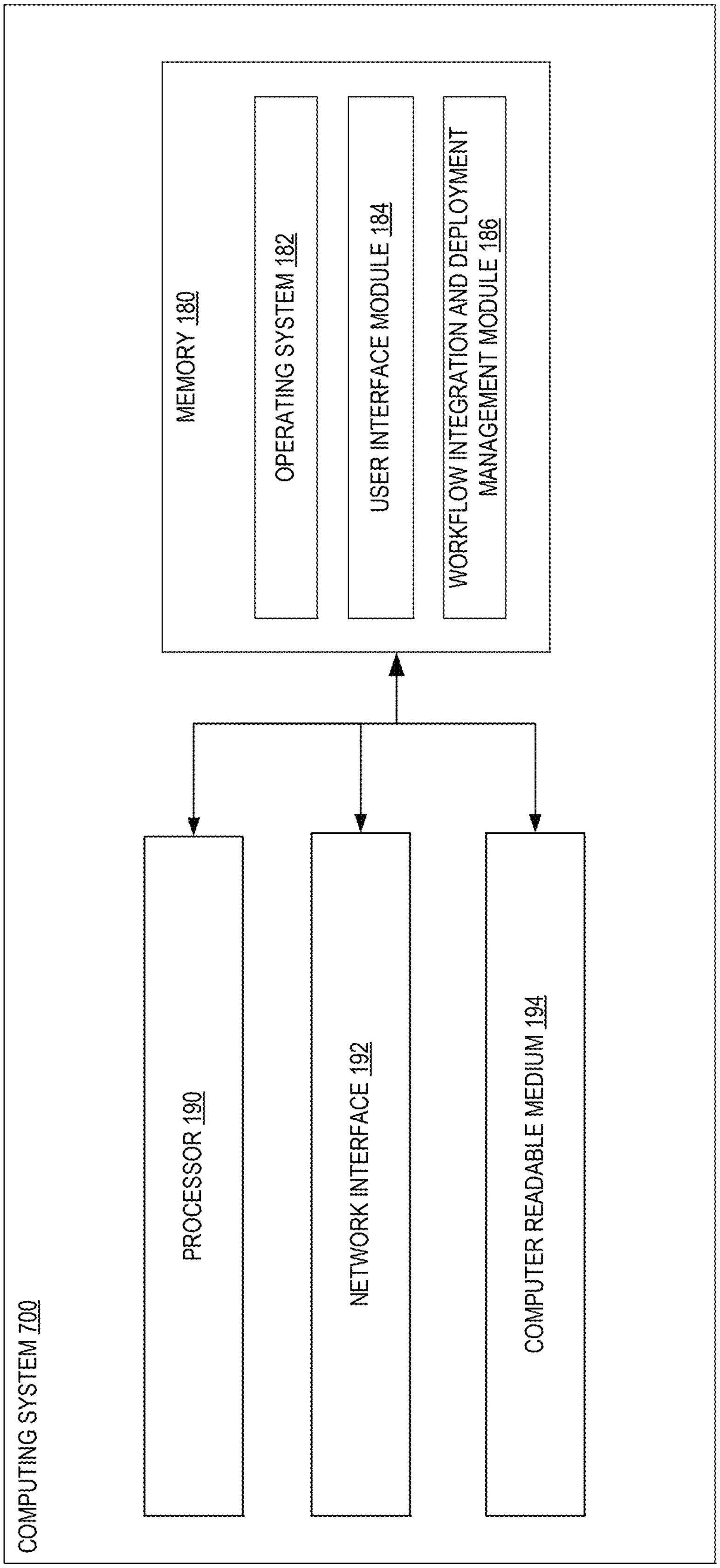
FIG. 7 depicts a general architecture of a computing device or system usable to implement one or more components descried herein, in accordance with aspects of the present disclosure.

FIG. 7 depicts an example architecture of a computing system 700 that can be used to perform one or more of the techniques described herein or illustrated in FIGS. 1-4. The general architecture of the computing system 700 depicted in FIG. 7 includes an arrangement of computer hardware and software modules that may be used to implement one or more aspects of the present disclosure. The computing system 700 may include many more (or fewer) elements than those shown in FIG. 7. It is not necessary, however, that all of these elements be shown in order to provide an enabling disclosure. For example, the computing system 700 may be used to implement one or more of the elements described herein, including the workflow integration and deployment service 140, block store service 105, object storage service 110, object storage service 110, compute service 150, and/or the user computing devices 102.

As illustrated, the computing system 700 includes a processor 190, a network interface 192, and a computer-readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 1.

The processor 190 may also communicate with memory 180. The memory 180 may contain computer program instructions (grouped as modules in some embodiments) that the processor 190 executes in order to implement one or more aspects of the present disclosure. The memory 180 may include RAM, ROM, and/or other persistent, auxiliary, or non-transitory computer-readable media. The memory 180 may store an operating system 182 that provides computer program instructions for use by the processor 190 in the general administration and operation of the computing system 700. The memory 180 may further include computer program instructions and other information for implementing one or more aspects of the present disclosure. For example, in one embodiment, the memory 180 includes a user interface module 184 that generates user interfaces (and/or instructions therefor) for display upon a user computing device (e.g., user computing device 102 of FIG. 1), e.g., via a navigation and/or browsing interface such as a browser or application installed on the user computing device. In addition, the memory 180 may include or communicate with one or more data stores.

In addition to and/or in combination with the user interface module 184, the memory 180 may include a workflow integration and deployment management module 186 that may be executed by the processor 190. In one embodiment, the workflow integration and deployment management module 186 implements various aspects of the present disclosure, e.g., those illustrated in FIGS. 1-6 or described with reference to FIGS. 1-6.

Although a single processor, a single network interface, a single computer-readable medium, and a single memory are illustrated in the example of FIG. 7, in other implementations, the computing system 700 can have a multiple of one or more of these components (e.g., two or more processors and/or two or more memories).

Example Implementations (EIs)

Some enumerated example implementations (EIs) are provided in this section, without limitation.

EI 1: A cloud provider system comprising: a code repository service storing a plurality of user tasks, wherein each task of the plurality of user tasks is configured to perform an operation as part of a workflow for performing data transformations; and a workflow integration and deployment service comprising computer hardware and in network communication with the code repository service, wherein the workflow integration and deployment service is configured to at least: receive, from the code repository service, an indication that a change has been made to a task associated with a user account; determine that the task is part of a live workflow that has been deployed on a first set of computing resources assigned to the user account and configured to receive input data from a source associated with the user account, transform the input data, and output the transformed input data to a destination associated with the user account; determine that the change made to the task is to be propagated to the live workflow such that additional input data subsequently received by the live workflow is transformed according to the change made to the task; identify a set of dependencies associated with the task based at least in part on the change made to the task, wherein the set of dependencies includes at least time dependency information usable to determine a time or time range at which the task is to be executed and cluster dependency information usable to determine a cluster of compute capacity in which the task is to be executed; generate an updated workflow that satisfies the set of dependencies associated with the task; cause the live workflow to be updated according to the updated workflow; and automatically execute the updated live workflow to cause the updated live workflow to receive additional input data from the source, transform the additional input data according to the change made to the task, and output the transformed additional input data to the destination.

EI 2: The cloud provider system of EI 1, wherein the cluster dependency information specifies an identifier associated with the cluster in which the task is to be executed.

EI 3: The cloud provider system of EI 1, wherein generating the updated workflow comprises scheduling the task to be executed in the cluster at a specific time or within a specific time range.

EI 4: The cloud provider system of EI 1, wherein determining that the change made to the task is to be propagated to the live workflow comprises: outputting a user notification indicating that an updated version of the task is available to be added to the live workflow; and receiving a user indication that the updated version of the task is to be added to the live workflow.

EI 5: A computer-implemented method comprising: determining that a change has been made to a task that is part of a live workflow for performing data transformations, wherein the live workflow comprises a plurality of tasks that are each configured to perform an operation as part of the live workflow and is configured to receive input data from a source, transform the input data, and output the transformed input data to a destination; determining that the change made to the task is to be propagated to the live workflow such that additional input data subsequently received by the live workflow is transformed according to the change made to the task; identifying a set of dependencies associated with the task based at least in part on the change made to the task; generating an updated workflow that satisfies the set of dependencies associated with the task; and updating the live workflow according to the updated workflow such that the updated live workflow is configured to receive additional input data from the source, transform the additional input data according to the change made to the task, and output the transformed additional input data to the destination.

EI 6: The computer-implemented method of EI 5, further comprising: deploying the updated workflow on a set of computing resources different from a set of computing resources on which the live workflow is deployed; inputting a set of test input data to the updated workflow; and determining that a set of test output data outputted by the updated workflow satisfies a condition for updating the live workflow.

EI 7: The computer-implemented method of EI 6, further comprising: receiving the set of test input data and a set of expected output data from a user; and determining that the set of test output data matches the set of expected output data.

EI 8: The computer-implemented method of EI 6, wherein determining that the set of test output data satisfies the condition comprises determining that a difference between the set of test output data and a set of prior output data outputted by the live workflow based on the set of test input data is within a threshold level.

EI 9: The computer-implemented method of EI 5, wherein generating the updated workflow comprises scheduling the task to be executed in a cluster at a specific time or within a specific time range.

EI 10: The computer-implemented method of EI 5, wherein the set of dependencies associated with the task includes one or more of (i) time dependency information usable to determine a time or time range at which the task is to be executed, (ii) cluster dependency information usable to determine a cluster of compute capacity in which the task is to be executed, (iii) code dependency information usable to determine a relative position of the task within the updated workflow, or (iv) resource dependency information usable to determine an amount of computing resources to be allocated to executing the task.

EI 11: The computer-implemented method of EI 5, wherein determining that the change made to the task is to be propagated to the live workflow comprises: outputting a user notification indicating that an updated version of the task is available to be added to the live workflow; and receiving a user indication that the updated version of the task is to be added to the live workflow.

EI 12: The computer-implemented method of EI 5, wherein determining that the change made to the task is to be propagated to the live workflow comprises accessing a user setting indicating that code changes committed to a code repository service are to be automatically propagated to the live workflow without additional user input.

EI 13: A non-transitory computer-readable medium storing instructions that, when executed by a computing system within a cloud provider network, cause the computing system to perform operations comprising: determining that a change has been made to a task that is part of a live workflow for performing data transformations, wherein the live workflow comprises a plurality of tasks that are each configured to perform an operation as part of the live workflow and is configured to receive input data from a source, transform the input data, and output the transformed input data to a destination; determining that the change made to the task is to be propagated to the live workflow such that additional input data subsequently received by the live workflow is transformed according to the change made to the task; identifying a set of dependencies associated with the task based at least in part on the change made to the task; generating an updated workflow that satisfies the set of dependencies associated with the task; and updating the live workflow according to the updated workflow such that the updated live workflow is configured to receive additional input data from the source, transform the additional input data according to the change made to the task, and output the transformed additional input data to the destination.

EI 14: The non-transitory computer-readable medium of EI 13, storing further instructions that, when executed by the computing system, cause the computing system to perform operations comprising: deploying the updated workflow on a set of computing resources different from a set of computing resources on which the live workflow is deployed; inputting a set of test input data to the updated workflow; and determining that a set of test output data outputted by the updated workflow satisfies a condition for updating the live workflow.

EI 15: The non-transitory computer-readable medium of EI 14, storing further instructions that, when executed by the computing system, cause the computing system to perform operations comprising: receiving the set of test input data and a set of expected output data from a user; and determining that the set of test output data matches the set of expected output data.

EI 16: The non-transitory computer-readable medium of EI 14, wherein determining that the set of test output data satisfies the condition comprises determining that a difference between the set of test output data and a set of prior output data outputted by the live workflow based on the set of test input data is within a threshold level.

EI 17: The non-transitory computer-readable medium of EI 13, wherein generating the updated workflow comprises scheduling the task to be executed in a cluster at a specific time or within a specific time range.

EI 18: The non-transitory computer-readable medium of EI 13, wherein the set of dependencies associated with the task includes one or more of (i) time dependency information usable to determine a time or time range at which the task is to be executed, (ii) cluster dependency information usable to determine a cluster of compute capacity in which the task is to be executed, (iii) code dependency information usable to determine a relative position of the task within the updated workflow, or (iv) resource dependency information usable to determine an amount of computing resources to be allocated to executing the task.

EI 19: The non-transitory computer-readable medium of EI 13, wherein determining that the change made to the task is to be propagated to the live workflow comprises: outputting a user notification indicating that an updated version of the task is available to be added to the live workflow; and receiving a user indication that the updated version of the task is to be added to the live workflow.

EI 20: The non-transitory computer-readable medium of EI 13, wherein determining that the change made to the task is to be propagated to the live workflow comprises accessing a user setting indicating that code changes committed to a code repository service are to be automatically propagated to the live workflow without additional user input.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A cloud provider system comprising:

one or more processors;

a code repository service, executed by the one or more processors, storing a plurality of user tasks, wherein each task of the plurality of user tasks when executed by the one or more processors is configured to perform an operation as part of an extract, transform, and load (ETL) workflow for extracting data from one or more data sources, transforming the data, and loading the transformed data onto one or more destinations; and a workflow integration and deployment service comprising a workflow manager with one or more workflow testing rules and in network communication with the code repository service, wherein the workflow integration and deployment service when executed by the one or more processors is configured to at least:

receive, from the code repository service, an indication that a code change has been made to a task associated with a user account;

determine that the task is part of a live ETL workflow that has been deployed based on the ETL workflow on a first set of computing resources assigned to the user account and configured to receive input data from a source associated with the user account, transform the input data, and output the transformed input data to a destination associated with the user account;

determine that the code change made to the task is to be propagated to the live ETL workflow such that any additional data subsequently received by the live ETL workflow is transformed according to the code change made to the task;

identify a set of dependencies associated with the task based at least in part on the code change made to the task, wherein the set of dependencies associated with the task includes code dependency information usable to determine a position of the task within an updated ETL workflow, and wherein the set of dependencies includes at least time dependency information usable to determine a time or time range at which the task is to be executed and cluster dependency information usable to determine a cluster of compute capacity in which the task is to be executed;

generate, using the workflow manager and based on the code dependency information, the time dependency information, and the cluster dependency information, the updated ETL workflow that includes the code change made to the task and satisfies the set of dependencies associated with the task;

test, using the workflow manager, the updated ETL workflow according to the one or more workflow testing rules associated with the user account to lower error rates;

update and deploy the live ETL workflow according to the updated ETL workflow based on the testing; and automatically execute the updated live ETL workflow to cause the updated live ETL workflow to receive additional input data from the source, transform the additional input data according to the code change made to the task, and output the transformed additional input data to the destination.

2. The cloud provider system of claim 1, wherein the cluster dependency information specifies an identifier associated with the cluster in which the task is to be executed.

3. The cloud provider system of claim 1, wherein generating the updated ETL workflow comprises scheduling the task to be executed in the cluster at a specific time or within a specific time range.

4. The cloud provider system of claim 1, wherein determining that the code change made to the task is to be propagated to the live ETL workflow comprises:

outputting a user notification indicating that an updated version of the task is available to be added to the live ETL workflow; and receiving a user indication that the updated version of the task is to be added to the live ETL workflow.

5. A computer-implemented method comprising:

receiving, from a code repository service executed by one or more processors, an indication that a code change has been made to a task associated with a user account that is part of a live extract, transform, and load (ETL) workflow that has been deployed on a first set of computing resources assigned to the user account for extracting data from one or more data sources, transforming the data, and loading the transformed data onto one or more destinations, wherein the live ETL workflow comprises a plurality of tasks that when executed by the one or more processors are each configured to perform an operation as part of the live ETL workflow and is configured to receive input data from a source associated with the user account, transform the input data, and output the transformed input data to a destination associated with the user account;

determining that the code change made to the task is to be propagated to the live ETL workflow such that any additional data subsequently received by the live ETL workflow is transformed according to the code change made to the task;

identifying a set of dependencies associated with the task based at least in part on the code change made to the task, wherein the set of dependencies associated with the task include code dependency information usable to determine a position of the task within an updated ETL workflow, and wherein the set of dependencies includes at least time dependency information usable to determine a time or time range at which the task is to be executed and cluster dependency information usable to determine a cluster of compute capacity in which the task is to be executed;

generating, by a workflow manager with one or more workflow testing rules of a workflow integration and deployment service executed by the one or more processors, the updated ETL workflow based at least on the code dependency information, the time dependency information, and the cluster dependency information, wherein the updated ETL workflow includes the code change made to the task and satisfies the set of dependencies associated with the task;

testing, by the workflow manager, the updated ETL workflow according to the one or more workflow testing rules associated with the user account to lower error rates;

updating and deploying the live ETL workflow according to the updated ETL workflow based on the testing; and automatically executing the updated live ETL workflow such that the updated live ETL workflow is configured to receive additional input data from the source, transform the additional input data according to the code change made to the task, and output the transformed additional input data to the destination.

6. The computer-implemented method of claim 5, further comprising:

deploying the updated ETL workflow on a set of computing resources different from the first set of computing resources on which the live ETL workflow is deployed;

inputting a set of test input data to the updated ETL workflow; and determining that a set of test output data outputted by the updated ETL workflow satisfies a condition for updating the live ETL workflow.

7. The computer-implemented method of claim 6, further comprising:

receiving the set of test input data and a set of expected output data from a user; and determining that the set of test output data matches the set of expected output data.

8. The computer-implemented method of claim 6, wherein determining that the set of test output data satisfies the condition comprises determining that a difference between the set of test output data and a set of prior output data outputted by the live ETL workflow based on the set of test input data is within a threshold level.

9. The computer-implemented method of claim 5, wherein generating the updated ETL workflow comprises scheduling the task to be executed in a cluster at a specific time or within a specific time range.

10. The computer-implemented method of claim 5, wherein the set of dependencies associated with the task includes resource dependency information usable to determine an amount of computing resources to be allocated to executing the task.

11. The computer-implemented method of claim 5, wherein determining that the code change made to the task is to be propagated to the live ETL workflow comprises:

outputting a user notification indicating that an updated version of the task is available to be added to the live ETL workflow; and receiving a user indication that the updated version of the task is to be added to the live ETL workflow.

12. The computer-implemented method of claim 5, wherein determining that the code change made to the task is to be propagated to the live ETL workflow comprises accessing a user setting indicating that code changes committed to the code repository service are to be automatically propagated to the live ETL workflow without additional user input.

13. A non-transitory computer-readable medium storing instructions that, when executed by one or more processors of a computing system within a cloud provider network, cause the computing system to perform operations comprising:

receiving, from a code repository service executed by the one or more processors, an indication that a code change has been made to a task associated with a user account that is part of a live extract, transform, and load (ETL) workflow that has been deployed on a first set of computing resources assigned to the user account for performing data transformations, wherein the live ETL workflow comprises a plurality of tasks that when executed by the one or more processors are each configured to perform an operation as part of the live ETL workflow and is configured to receive input data from a source associated with the user account, transform the input data, and output the transformed input data to a destination associated with the user account;

determining that the code change made to the task is to be propagated to the live ETL workflow such that any additional data subsequently received by the live ETL workflow is transformed according to the code change made to the task;

identifying a set of dependencies associated with the task based at least in part on the code change made to the task, wherein the set of dependencies associated with the task include code dependency information usable to determine a position of the task within an updated ETL workflow, and wherein the set of dependencies includes at least time dependency information usable to determine a time or time range at which the task is to be executed and cluster dependency information usable to determine a cluster of compute capacity in which the task is to be executed;

generating, by a workflow manager with one or more workflow testing rules of a workflow integration and deployment service executed by the one or more processors, the updated ETL workflow based at least on the code dependency information, the time dependency information, and the cluster dependency information, wherein the updated ETL workflow includes the code change made to the task and satisfies the set of dependencies associated with the task;

testing, by the workflow manager, the updated ETL workflow according to the one or more workflow testing rules associated with the user account to lower error rates;

updating and deploying the live ETL workflow according to the updated ETL workflow based on the testing; and automatically executing the updated live ETL workflow such that the updated live ETL workflow is configured to receive additional input data from the source, transform the additional input data according to the code change made to the task, and output the transformed additional input data to the destination.

14. The non-transitory computer-readable medium of claim 13, storing further instructions that, when executed by the one or more processors of the computing system, cause the computing system to perform operations comprising:

deploying the updated ETL workflow on a set of computing resources different from the first set of computing resources on which the live ETL workflow is deployed;

inputting a set of test input data to the updated ETL workflow; and determining that a set of test output data outputted by the updated ETL workflow satisfies a condition for updating the live ETL workflow.

15. The non-transitory computer-readable medium of claim 14, storing further instructions that, when executed by the one or more processors of the computing system, cause the computing system to perform operations comprising:

receiving the set of test input data and a set of expected output data from a user; and determining that the set of test output data matches the set of expected output data.

16. The non-transitory computer-readable medium of claim 14, wherein determining that the set of test output data satisfies the condition comprises determining that a difference between the set of test output data and a set of prior output data outputted by the live ETL workflow based on the set of test input data is within a threshold level.

17. The non-transitory computer-readable medium of claim 13, wherein generating the updated ETL workflow comprises scheduling the task to be executed in a cluster at a specific time or within a specific time range.

18. The non-transitory computer-readable medium of claim 13, wherein the set of dependencies associated with the task further includes resource dependency information usable to determine an amount of computing resources to be allocated to executing the task.

19. The non-transitory computer-readable medium of claim 13, wherein determining that the code change made to the task is to be propagated to the live ETL workflow comprises:

outputting a user notification indicating that an updated version of the task is available to be added to the live ETL workflow; and receiving a user indication that the updated version of the task is to be added to the live ETL workflow.

20. The non-transitory computer-readable medium of claim 13, wherein determining that the code change made to the task is to be propagated to the live ETL workflow comprises accessing a user setting indicating that code changes committed to the code repository service are to be automatically propagated to the live ETL workflow without additional user input.

* * * * *